(12) United States Patent
Ford et al.

(10) Patent No.: US 6,417,298 B1
(45) Date of Patent: *Jul. 9, 2002

(54) PROCESS FOR PRODUCING ETHYLENE/OLEFIN INTERPOLYMERS

(75) Inventors: Randal Ray Ford; Jeffrey James Vanderbilt; Darryl Stephen Williams, all of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,363

(22) Filed: Aug. 31, 1999

Related U.S. Application Data

(60) Provisional application No. 60/137,981, filed on Jun. 7, 1999.

(51) Int. Cl.[7] .............................. C08F 2/04; C08F 4/16
(52) U.S. Cl. ..................... 526/89; 526/127; 526/124.1; 526/160; 526/161; 526/948; 526/348.6; 502/104; 502/152
(58) Field of Search .......................... 526/89, 160, 161, 526/943, 348.6, 127, 124.1; 502/104, 152

(56) References Cited

U.S. PATENT DOCUMENTS

| | | | |
|---|---|---|---|
| 3,709,853 A | 1/1973 | Karapinka | |
| 4,003,712 A | 1/1977 | Miller | |
| 4,011,382 A | 3/1977 | Levine et al. | |
| 4,012,573 A | 3/1977 | Trieschmann et al. | |
| 4,076,698 A | 2/1978 | Anderson et al. | |
| 4,302,566 A | 11/1981 | Karol et al. | |
| 4,543,399 A | 9/1985 | Jenkins, III et al. | |
| 4,564,647 A | 1/1986 | Hayashi et al. | |
| 4,752,597 A | 6/1988 | Turner et al. | |
| 4,882,400 A | 11/1989 | Dumain et al. | |
| 5,106,804 A * | 4/1992 | Bailly et al. | 502/108 |
| 5,132,380 A | 7/1992 | Stevens et al. | |
| 5,227,440 A | 7/1993 | Canich et al. | |
| 5,296,565 A | 3/1994 | Ueda et al. | |
| 5,324,800 A | 6/1994 | Welborn, Jr. et al. | |
| 5,331,071 A | 7/1994 | Kataoka et al. | |
| 5,332,706 A | 7/1994 | Nowlin et al. | |
| 5,350,723 A | 9/1994 | Neithamer et al. | |
| 5,352,749 A | 10/1994 | DeChellis et al. | |
| 5,399,635 A | 3/1995 | Neithamer et al. | |
| 5,466,766 A | 11/1995 | Patsidis et al. | |
| 5,468,702 A | 11/1995 | Jejelowo | |
| 5,474,962 A | 12/1995 | Takahashi et al. | |
| 5,541,270 A | 7/1996 | Chinh et al. | |
| 5,578,537 A | 11/1996 | Herrmann et al. | |
| 5,863,853 A | 1/1999 | Vaughan et al. | |
| 6,114,477 A * | 9/2000 | Merrill et al. | 526/68 |

FOREIGN PATENT DOCUMENTS

| | | |
|---|---|---|
| BE | 839380 | 9/1976 |
| CA | 991798 | 6/1976 |
| EP | 0 564 211 A | 10/1993 |
| EP | 0 630 910 A | 12/1994 |
| EP | 0 703 246 A | 3/1996 |
| EP | 0 719 803 A | 7/1996 |
| EP | 0 811 638 A | 12/1997 |
| FR | 1 180 416 A | 6/1959 |
| GB | 851113 | 10/1960 |

OTHER PUBLICATIONS

US 5,883,203, 03/1999, Cheruvu et al. (withdrawn)

* cited by examiner

Primary Examiner—David W. Wu
Assistant Examiner—R. Harlan
(74) Attorney, Agent, or Firm—Bernard J. Graves, Jr.; Jonathan D. Wood

(57) ABSTRACT

There is described a process utilizing metallocene catalyst for producing ethylene/olefin interpolymers which, for a given melt index and density, have a reduced melting peak temperature ($T_m$). The process involves contacting ethylene and at least one other olefin under polymerization conditions with a metallocene catalyst and at least one modifier comprising at least one element from Group 15 and/or Group 16 in amounts sufficient to reduce the melting peak temperature of the ethylene/olefin interpolymer. Also described herein are novel ethylene/olefin interpolymers resulting from the process.

58 Claims, No Drawings

PROCESS FOR PRODUCING ETHYLENE/OLEFIN INTERPOLYMERS

CROSS-REFERENCE TO RELATED APPLICATION

This application claims priority under 35 U.S.C. §119(e) to U.S. Provisional Application Ser. No. 60/137,981, filed Jun. 7, 1999.

FIELD OF INVENTION

The present invention relates to a process utilizng a metallocene catalyst for producing ethylene/olefin interpolymers, which for a given melt index (MI) and density, have reduced melting peak temperatures ($T_m$). Melting peak temperature ($T_m$) is alternatively referred to as melt transition temperature or melting point. The present invention also relates to a process for reducing the melting peak temperature ($T_m$) of ethylene/olefin interpolymers having a given melt index and density. Additionally, this invention relates to novel ethylene/olefin interpolymers, and films and articles of manufacture produced therefrom.

BACKGROUND OF INVENTION

Polyethylene and interpolymers of ethylene are well known and are useful in many applications. In particular linear interpolymers of ethylene, also known as copolymers, terpolymers, and the like of ethylene, possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polymers and interpolymers of ethylene is a gas phase process. Examples of such are given in U.S. Pat. Nos. 3,709,853; 4,003,712; 4,011,382; 4,302,566; 4,543,399; 4,882,400; 5,352,749 and 5,541,276 and Canadian Patent No. 991,798 and Belgian Patent No. 839,380.

Metallocene catalysts are known for polymerizing and interpolymerizing ethylene. Metallocene catalysts comprise at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component. Typical organometallic co-catalysts are alkyl aluminoxanes, such as methyl aluminokane, and boron containing compounds such as tris(perfluorophenyl)boron and salts of tetrakis(perfluorophenyl)borate.

The metallocene catalysts can be supported on an inert porous particulate carrier.

The use of internal electron donors with metallocene catalysts is disclosed in U.S. Pat. No. 5,106,804. The use of external electron donors with metallocene catalysts to control molecular weight is disclosed in U.S. Pat. No. 5,883,203.

Illustrative examples of electron donors include anhydrides, acid halides, ethers, thioethers, aldehydes, ketones, imines, amnines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom.

SUMMARY OF THE INVENTION

Applicants have unexpectedly found that the addition of at least one compound comprising at least one element from Group 15 and/or Group 16 of the Periodic Table of Elements, herein referred to as a modifier, in a process utilizing metallocene catalysts for preparing ethylene/olefin interpolymers, having a given melt index and density, reduces the melting peak temperature ($T_m$) of the ethylene/olefin interpolymer. The melting peak temperature ($T_m$) values herein are obtained by Differential Scanning Calorimetry in accordance with ASTM D 3418-97.

The polymerization process of the present invention for producing an ethylene/olefin interpolymer having, at a given melt index and density, a reduced melting peak temperature ($T_m$) comprises the introduction into a polymerization medium containing ethylene and at least one or more other olefin(s), at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and at least one modifier, wherein the modifier is present in the polymerization medium in an amount sufficient to reduce the melting peak temperature ($T_m$) of the ethylene/olefin interpolymer to a level lower than would result in the same polymerization process in the absence of the modifier.

The present invention also relates to a process for reducing the melting peak temperature ($T_m$) of an ethylene/olefin interpolymer having a given melt index (MI) and density. The process comprises introducing a modifier, into a polymerization process containing ethylene and at least one or more other olefin(s) and at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, in an amount sufficient to reduce the melting peak temperature ($T_m$).

In a further embodiment of the present invention, it has been found desirable to add at least one or more organometallic compounds, in addition to the metallocene catalyst(s), to the polymerization medium.

The present invention also relates to ethylene/olefin interpolymers, which for a given melt index and density, have a reduced melting peak temperature ($T_m$).

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

Applicants have unexpectedly found that the addition of at least one compound comprising at least one element from Group 15 and/or Group 16 of the Periodic Table of Elements, herein referred to as a modifier, in a process utilizing metallocene catalysts for preparing ethylene/olefin interpolymers, having a given melt index and density, reduces the melting peak temperature ($T_m$) of the ethylene/olefin interpolymer. The melting peak temperature ($T_m$) values herein are obtained by Differential Scanning Calorimetry in accordance with ASTM D 3418-97.

The polymerization process of the present invention for producing an ethylene/olefin interpolymer having, at a given melt index and density, a reduced melting peak temperature ($T_m$) comprises the introduction into a polymerization medium containing ethylene and at least one or more other olefin(s), at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and at least one modifier, wherein the modifier is present in the polymerization medium in an amount sufficient to reduce the melting peak temperature ($T_m$) of the ethylene/olefin interpolymer to a level lower than would result in the same polymerization process in the absence of the modifier.

The present invention also relates to a process for reducing the melting peak temperature ($T_m$) of an ethylene/olefin interpolymer having a given melt index (MI) and density. The process comprises introducing a modifier, into a polymerization process containing ethylene and at least one or more other olefin(s) and at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, in an amount sufficient to reduce the melting peak temperature ($T_m$).

In a further embodiment of the present invention, it has been found desirable to add at least one or more organometallic compounds, in addition to the metallocene catalyst(s), to the polymerization medium.

The present invention also relates to ethylene/olefin interpolymers, which for a given melt index and density, have a reduced melting peak temperature ($T_m$).

Optionally a halogenated hydrocarbon may be added to the polymerization medium. Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon atoms. Preferred for use in the process of the present invention are dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane. Most preferred for use in the process of the present invention is chloroform.

The modifier and the optional halogenated hydrocarbon may be added to the polymerization medium in any manner. The modifier and the halogenated hydrocarbon may be added to the metallocene catalyst herein prior to addition to the polymerization medium, or added separately from the catalyst to the polymerization medium in any manner known in the art. For example, the modifier may optionally be premixed with the halogenated hydrocarbon prior to addition to the polymerization medium.

If a gas phase fluidized bed process is utilized for interpolymerization of ethylene, it may be advantageous to add the modifier prior to the heat removal means, e.g., the heat exchanger, to slow the rate of fouling of said heat removal means in addition to reducing the melting peak temperature of the polymer product.

The modifier used herein to reduce the melting peak temperature ($T_m$) of the ethylene/olefin interpolymer is any compound containing at least one atom selected from Group 15 and/or Group 16 of the Periodic Table of Elements. Illustrative examples of modifiers include carboxylic acid esters, anhydrides, acid halides, ethers, thioethers, aldehydes, ketones, imines, amines, amides, nitrites, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom and nitrogen, phosphorus, arsenic or antimony compounds connected to an organic group through a carbon or oxygen atom. Also illustrative are compounds such as $O_2$, $CO$, $CO_2$, $COS$, $NO$, $N_2O$, $NO_2$ and the like.

Exemplary of ethers used herein to reduce the meting peak temperature are any compounds containing at least one C—O—C ether linkage. Included within the ether compounds are compounds containing heteroatoms, which are atoms other than carbon, selected from Groups 13, 14, 15, 16 and 17 of the Periodic Table of Elements. Exemplary ethers are dialkyl ethers, diaryl ethers, dialkaryl ethers, diaralkyl ethers, alkyl aryl ethers, alkyl alkaryl ethers, alkyl aralkyl ethers, aryl alkaryl ethers, aryl aralkyl ethers and alkaryl aralkyl ethers. Included within the ethers are compounds such as dimethyl ether; diethyl ether: dipropyl ether, diisopropyl ether; dibutyl ether; diisoamyl ether; di-tert-butyl ether; diphenyl ether; dibenzyl ether; divinyl ether; butyl methyl ether; butyl ethyl ether; sec-butyl methyl ether; tert-butyl methyl ether; cyclopentyl methyl ether; cyclohexyl ethyl ether; tert-amyl methyl ether; sec-butyl ethyl ether; chloromethyl methyl ether; trimethylsilylmethyl methyl ether; bis(trimethylsilylmethyl)ether; bis(2,2,2-trifluoroethyl)ether; methyl phenyl ether; ethylene oxide; propylene oxide; 1,2-epoxybutane; cyclopentene oxide; epichlorohydrin; furan; 2,3-dihydrofuran; 2,5-dihydrofuran; tetrahydrofuran; 2-methyltetrahydrofuran; 2,5-dimethyltetrahydrofuran; 2-methylfuran; 2,5-dimethylfuran; tetrahydropyran; 1,2-epoxybut-3-ene; styrene oxide; 2-ethylfuran; oxazole; 1,3,4-oxadiazole; 3,4-dichloro-1,2 epoxybutane; 3,4-dibromo-1,2-epoxybutane; dimethoxymethane; 1,1-dimethoxyethane; 1,1,1-trimethoxymethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; di(ethylene glycol)dimethyl ether; di(ethylene glycol)diethyl ether; di(ethylene glycol)dibutyl ether; di(ethylene glycol)tert-butyl methyl ether; tri(ethylene glycol)dimethyl ether; tri(ethylene glycol)diethyl ether; tetra (ethylene glycol)dimethyl ether; 2,2-diethyl-1,3- dimethoxypropane; 2-methyl-2-ethyl-1,3-dimethoxypropane; 2-methoxyfuran; 3-methoxyfuran; 1,3-dioxolane; 2-methyl-1,3-dioxolane; 2,2-dimethyl- 1,3-dioxolane; 2-ethyl-2-methyl- 1,3-dioxolane; 2,2-tetramethylene-1,3-dioxolane; 2,2-pentamethylene-1,3-dioxolane; 1,3-dioxane; 1,4-dioxane; 4-methyl-1,3-dioxane; 1,3,5-trioxane and 3,4-epoxytetrahydrofuran and the like.

Preferred for use herein as ether compounds to reduce the melting peak temperature are tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, and tetrahydropyran.

Exemplary of thioethers used herein to reduce the melting peak temperature are any compounds containing at least one C—S—C thioether linkage. Included within the thioether compounds are compounds containing heteroatoms, which are atoms other than carbon, selected from Groups 13, 14, 15, 16 and 17 of the Periodic Table of Elements. Exemplary thioethers are dialkyl thioethers, diaryl thioethers, dialkaryl thioethers, diaralkyl thioethers, alkyl aryl thioethers, alkyl alkaryl thioethers, alkyl aralkyl thioethers, aryl alkaryl thioethers, aryl aralkyl thioethers and alkaryl aralkyl thioethers. Included are compounds such as dimethyl sulfide; diethyl sulfide; dipropyl sulfide; diisopropyl sulfide; dibutyl sulfide; dipentyl sulfide; dihexyl sulfide; dioctyl sulfide; diisoamyl sulfide; di-tert-butyl sulfide; diphenyl sulfide; dibenzyl sulfide; divinyl sulfide; diallyl sulfide; dipropargyl sulfide; dicyclopropyl sulfide; dicyclopentyl sulfide; dicyclohexyl sulfide; allyl methyl sulfide; allyl ethyl sulfide; allyl cyclohexyl sulfide; allyl phenyl sulfide; allyl benzyl sulfide; allyl 2-tolyl sulfide; allyl 3-tolyl sulfide; benzyl methyl sulfide; benzyl ethyl sulfide; benzyl isoamyl sulfide; benzyl chloromethyl sulfide; benzyl cyclohexyl sulfide; benzyl phenyl sulfide; benzyl 1-naphthyl sulfide; benzyl 2-naphthyl sulfide; butyl methyl sulfide; butyl ethyl sulfide; sec-butyl methyl sulfide; tert-butyl methyl sulfide; butyl cyclopentyl sulfide; butyl 2-chloroethyl sulfide; cyclopentyl methyl sulfide; cyclohexyl ethyl sulfide; cyclohexyl vinyl sulfide; tert-amyl methyl sulfide; sec-butyl ethyl sulfide; tert-butyl ethyl sulfide; tert-amyl ethyl sulfide; cyclododecyl methyl sulfide; bis(2-cyclopenten-1-yl)sulfide; 1-methylthio-1,3-cyclohexadiene; 1-methylthio-1,4-cyclohexadiene; chloromethyl methyl sulfide; chloromethyl ethyl sulfide; bis(2-tolyl)sulfide; trimethylsilylmethyl methyl sulfide; trimethylene sulfide; thiophene; 2,3-dihydrothiophene; 2,5-dihydrothiophene, tetrahydrothiophene: 2-methyltetrahydrothiophene; 2,5-dimethyltetrahydrothiophene; 4,5-dihydro-2-methylthiophene; 2-methylthiophene; 2,5-dimethylthiophene; 3-bromothiophene; 2,3-benzothiophene; 2-methylbenzothiophene; dibenzothiophene; isobenzothiophene; 1,1-bis(methylthio)ethane; 1,1,1-tris(methylthio)ethane; 1,1,2-tris(methylthio)ethane; 1,1-bis(methylthio)propane; 1,2-bis(methylthio)propane; 2,2-bis(methylthio)propane; 1,3-bis(methylthio)propane; 1,1,3-tris(methylthio)propane: 1,4-bis(methylthio)butane; 1,2-bis(methylthio)benzene; 1,3-bis(methylthio)benzene; 1,4-bis(methylthio)benzene; ethylene glycol dimethyl sulfide; ethylene glycol diethyl sulfide; ethylene glycol divinyl sulfide; ethylene glycol diphenyl sulfide; ethylene glycol tert-butyl methyl sulfide; ethylene glycol tert-butyl ethyl sulfide; 2,5-bis(methylthio)thiophene; 2-methylthiothiophene; 3-methylthiothiophene, 2-methylthiotetrahydropyran, 3-methylthiotetrahydropyran; 1,3-dithiolane; 2-methyl-1,3-dithiolane; 2,2-dimethyl-1,3-dithiolane; 2-ethyl-2-methyl-1,3-dithiolane; 2,2-tetramethylene-1,3-dithiolane: 2,2-pentamethylene-1,3-dithiolane; 2-vinyl-1,3-dithiolane; 2-chloromethyl-1,3-dithiolane; 2-methylthio-1,3-dithiolane; 1,3-dithiolane; 1,4-dithiolane; 4-methyl-1,3-dithiolane; 1,3,5-trithiane; 2-(2-ethylhexyl)-1,3-bis(methylthio)propane; 2-isopropyl-1,3-bis(methylthio)propane; 2-butyl-1,3-bis(methylthio)propane; 2-sec-butyl-1,3-bis(methylthio)propane; 2-tert-butyl-1,3-bis(methylthio)propane; 2-cyclohexyl-1,3-bis(methylthio)propane; 2-phenyl- 1,3-bis(methylthio)propane; 2-cumyl-1,3-bis(methylthio)propane; 2-(2-phenylethyl)-1,3-bis(methylthio)propane; 2-(2-cyclohexylethyl)- 1,3-bis(methylthio)propane; 2-(p-chlorophenyl)-1,3-bis(methylthio)propane; 2-(p-fluorophenyl)-1,3-bis(methylthio)propane; 2-(diphenylmethyl)-1,3-bis(methylthio)propane; 2,2-dicyclohexyl-1,3-bis(methylthio)propane; 2,2-diethyl-1,3-bis(methylthio)propane; 2,2-dipropyl-1,3-bis(methylthio)propane; 2,2-diisopropyl-1,3-bis(methylthio)propane: 2,2-dibutyl-1,3-bis(methylthio)propane; 2,2-diisobutyl-1,3-bis(methylthio)propane; 2-methyl-2-ethyl-1,3-bis(methylthio)propane; 2-methyl-2-propyl-1,3-bis(methylthio)propane; 2-methyl-2-butyl-1,3-bis(methylthio)propane; 2-methyl-2-benzyl-1,3-bis(methylthio)propane; 2-methyl-2-methylcyclohexyl-1,3-bis(methylthio)propane; 2-isopropyl-2-isopentyl-1,3-bis(methylthio)propane; 2,2-bis(2-cyclohexylmethyl)-1,3-bis(methylthio)propane and the like.

Any amine may be used herein to reduce the melting peak temperature. Included are amine compounds containing heteroatoms, which are atoms other than carbon, selected from Groups 13, 14, 15, 16 and 17 of the Periodic Table of Elements. Exemplary amines are primary, secondary and tertiary alkyl, aryl, alkaryl and aralkyl substituted amines. Exemplary of amines are ammonia; methylamine; ethylamine; propylamine; isopropylamine; butylamine; isobutylamine; amylamine; isoamylamine; octylamnine; cyclohexylamine; aniline; dimethylamine; diethylamine; dipropylamine; diisopropylamine; dibutylamine; diisobutylamine; diamylamine; diisoamylamine; dioctylamine; dicyclohexylamine; trimethylamine; triethylamine; tripropylamine; triisopropylamine; tributylamine; triisobutylamine; triamylamine; triisoamylamine; trioctylamine; tricyclohexylamine; N-methylaniline; N-ethylaniline; N-propylaniline; N-isopropylaniline; N-butylaniline; N-isobutylaniline; N-amylaniline; N-isoamylaniline; N-octylaniline; N-cyclohexylaniline; N,N-dimethylaniline; N,N-diethylaniline; N,N-dipropylaniline; N,N-diisopropylaniline; N,N-dibutylaniline; N,N-diisobutylaniline; N,N-diamylaniline; N,N-diisoamylaniline; N,N-dioctylaniline; N,N-dicyclohexylaniline; azetidine; 1-methylazetidine; 1-ethylazetidine; 1-propylazetidine; 1-isopropylazetidine; 1-butylazetidine; 1-isobutylazetidine; 1-amylazetidine; 1-isoamylazetidine; pyrrolidine; N-methylimidazole; 1-methylpyrrolidine; 1-ethylpyrrolidine; 1-propylpyrrolidine; 1-isopropylpyrrolidine; 1-butylpyrrolidine; 1-isobutylpyrrolidine; 1-amylpyrrolidine; 1-isoamylpyrrolidine; 1-octylpyrrolidine; 1-cyclohexylpyrrolidine; 1-phenylpyrrolidine; piperidine; 1-methylpiperidine; 1-ethylpiperidine; 1-propylpiperidine; 1-isopropylpiperidine; 1-butylpiperidine; 1-isobutylpiperidine; 1-amylpiperidine; 1-isoamylpiperidine; 1-octylpiperidine; 1-cyclohoxylpiperidine; 1-phenylpiperidine; piperazine; 1-methylpiperazine; 1-ethylpiperazine; 1-propylpiperazine;

1-isopropylpiperazine; 1-butylpiperazine; 1-isobutylpiperazine; 1-amylpiperazine; 1-isoamylpiperazine; 1-octylpiperazine; 1-cyclohexylpiperazine; 1-phenylpiperazine; 1,4-dimethylpiperazine; 1,4-diethylpiperazine; 1,4-dipropylpiperazine; 1,4-diisopropylpiperazine; 1,4-dibutylpiperazine; 1,4-diisobutylpiperazine; 1,4-diamylpiperazine; 1,4-diisoamylpiperazine:, 1,4-dioctylpiperazine: 1,4-dicyclohexylpiperazine; 1,4-diphenylpiperazine; pyridine; 2-methyl pyridine; 4-methyl pyridine; hexamethyldisilazane; morpholine; N-methylmorpholine and the like. Preferred for use herein are pyridine, 4-methyl pyridine, N-methylmorpholine and N-methylimidazole.

Exemplary of carboxylic acid esters used herein to reduce the melting peak temperature are any carboxylic acid ester compounds containing at least one C(=O)—O—C ester linkage. Exemplary carboxylic acid esters are saturated or unsaturated aliphatic, alicyclic, or aromatic compounds containing an ester linkage. Included within the carboxylic acid esters are compounds containing heteroatoms, which are atoms other than carbon, selected from Groups 13, 14, 15, 16 and 17 of the Periodic Table of Elements. Further exemplary are carboxylic acid esters such as methyl formate; methyl acetate; ethyl acetate; vinyl acetate; propyl acetate; butyl acetate; isopropyl acetate; isobutyl acetate; octyl acetate; cyclohexyl acetate; ethyl propionate; ethyl valerate; methyl chloroacetate; ethyl dichloroacetate, methyl methacrylate; ethyl crotonate; ethyl pivalate; methyl benzoate; ethyl benzoate; propyl benzoate; butyl benzoate; isobutyl benzoate; isopropyl benzoate; octyl benzoate; cyclohexyl benzoate; phenyl benzoate; benzyl benzoate; methyl 2-methylbenzoate; ethyl 2-methylbenzoate, propyl 2-methylbenzoate:, isopropyl 2-methylbenzoate; butyl 2-methylbenzoate; isobutyl 2-methylbenzoate; octyl 2-methylbenzoate; cyclohexyl 2-methylbenzoate; phenyl 2-methylbenzoate; benzyl 2-methylbenzoate; methyl 3-methylbenzoate; ethyl 3-methylbenzoate; propyl 3-methylbenzoate; isopropyl 3-methylbenzoate; butyl 3-methylbenzoate; isobutyl 3-methylbenzoate; octyl 3-methylbenzoate; cyclohexyl 3-methylbenzoate; phenyl 3-methylbenzoate; benzyl 3-methylbenzoate; methyl 4-methylbenzoate; ethyl 4-methylbenzoate; propyl 4-methylbenzoate; isopropyl 4-methylbenzoate; butyl 4-methylbenzoate; isobutyl 4-methylbenzoate; octyl 4-methylbenzoate; cyclohexyl 4-methylbenzoate; phenyl 4-methylbenzoate; benzyl 4-methylbenzoate; methyl o-chlorobenzoate; ethyl o-chlorobenzoate; propyl o-chlorobenzoate; isopropyl o-chlorobenzoate; butyl o-chlorobenzoate; isobutyl o-chlorobenzoate; amyl o-chlorobenzoate; isoamyl o-chlorobenzoate; octyl o-chlorobenzoate; cyclohexyl o-chlorobenzoate; phenyl o-chlorobenzoate; benzyl o-chlorobenzoate ; methyl m-chlorobenzoate; ethyl m-chlorobenzoate; propyl m-chlorobenzoate; isopropyl m-chlorobenzoate; butyl m-chlorobenzoate; isobutyl m-chlorobenzoate; amyl m-chlorobenzoate; isoamyl m-chlorobenzoate; octyl m-chlorobenzoate; cyclohexyl m-chlorobenzoate; phenyl m-chlorobenzoate; benzyl m-chlorobenzoate; methyl p-chlorobenzoate; ethyl p-chlorobenzoate; propyl p-chlorobenzoate; isopropyl p-chlorobenzoate; butyl p-chlorobenzoate; isobutyl p-chlorobenzoate; amyl p-chlorobenzoate; isoamyl p-chlorobenzoate; octyl p-chlorobenzoate; cyclohexyl p-chlorobenzoate; phenyl p-chlorobenzoate; benzyl p-chlorobenzoate; dimethyl maleate; dimethyl phthalate; diethyl phthalate; dipropyl phthalate; dibutyl phthalate; diisobutyl phthalate; methyl ethyl phthalate; methyl propyl phthalate; methyl butyl phthalate; methyl isobutyl phthalate; ethyl propyl phthalate; ethyl butyl phthalate; ethyl isobutyl phthalate; propyl butyl phthalate; propyl isobutyl phthalate; dimethyl terephthalate; diethyl terephthalate; dipropyl terephthalate; dibutyl terephthalate; diisobutyl terephthalate; methyl ethyl terephthalate; methyl propyl terephthalate; methyl butyl terephthalate; methyl isobutyl terephthalate; ethyl propyl terephthalate; ethyl butyl terephthalate; ethyl isobutyl terephthalate; propyl butyl terephthalate; propyl isobutyl terephthalate; dimethyl isophthalate; diethyl isophthalate; dipropyl isophthalate; dibutyl isophthalate; diisobutyl isophthalate; methyl ethyl isophthalate; methyl propyl isophthalate; methyl butyl isophthalate; methyl isobutyl isophthalate; ethyl propyl isophthalate; ethyl butyl isophthalate; ethyl isobutyl isophthalate; propyl butyl isophthalate; propyl isobutyl isophthalate, cellulose acetate, cellulose butyrate, mixed esters of cellulose and the like.

Exemplary of thioesters used herein to reduce the melting peak temperature are compounds containing at least one C(=O)—S—C thioester linkage. Exemplary are saturated or unsaturated aliphatic, alicyclic, or aromatic compounds containing a thioester linkage. Included within the thioesters are compounds containing heteroatoms, which are atoms other than carbon, selected from Groups 13, 14, 15, 16 and 17 of the Periodic Table of Elements. Exemplary thioesters are methyl thiolacetate; ethyl thiolacetate; propyl thiolacetate; isopropyl thiolacetate; butyl thiolacetate; isobutyl thiolacetate; amyl thiolacetate; isoamyl thiolacetate; octyl thiolacetate; cyclohexyl thiolacetate; phenyl thiolacetate; 2-chloroethyl thiolacetate; 3-chloropropyl thiolacetate; methyl thiobenzoate; ethyl thiobenzoate; propyl thiobenzoate; isopropyl thiobenzoate; butyl thiobenzoate; isobutyl thiobenzoate; amyl thiobenzoate; isoamyl thiobenzoate; octyl thiobenzoate; cyclohexyl thiobenzoate phenyl thiobenzoate; 2-chloroethyl thiobenzoate; 3-chloropropyl thiobenzoate and the like.

Exemplary of amides used herein to reduce the melting peak temperature are compounds containing at least one C(=O)—N amide linkage. Exemplary are saturated or unsaturated aliphatic, alicyclic, or aromatic compounds containing an amide linkage. Included within the amides are compounds containing heteroatoms, which are atoms other than carbon, selected from Groups 13, 14, 15, 16 and 17 of the Periodic Table of Elements, Exemplary of amides are formamide; acetamide; propionamide; isobutyramide; trimethylacetamide; hexanoamide; octadecanamide; cyclohexanecarboxamide; 1-adamantanecarboxamide; acrylamide; methacrylamide; 2-fluoroacetamidce; 2-chloroacetamide; 2-bromoacetamide; 2,2-dichloroacetamide; 2,2,2-trifluoroacetamide; 2,2,2-trichloroacetamide; 2-chloropropionamide; benzamide; N-methylformamide; N-ethylformamide; N-propylformamide; N-butylformamide; N-isobutylformamide; N-amylformamide; N-cyclohexylformamide; formanilide; N-methylacetamide; N-ethylacetamide; N-propylacetamide; N-butylacetamide; N-isobutylacetamide; N-amylacetamide; N-cyclohexylacetamide; acetanilide; N-methylpropionanmide; N-ethylpropionamide; N-propylpropionamide; N-butylpropionamide; N-isobutylpropionamide; N-amylpropionamide; N-cyclohexylpropionamiide; N-phenylpropionamide; N-methylisobutyraminde; N-methyltrimethylacetamide; N-methylhexanoamide; N-methyloctadecanamide; N-methylacrylamide; N-methylmethacrylamide; N-methyl-2-fluoroacetamide; N-methyl-2-chloroacetamide; N-methyl-2-bromoacetamide; N-methyl-2,2-dichloroacetamide;

N-methyl-2,2,2-trifluoroacetamide; N-methyl-2,2,2-trichloroacetamide; N-methyl-2-chloropropionamide; N,N-dimethylformamide; N,N-diethylformamide; N,N-diisopropylformamide; N,N-dibutylformamide; N-methylformanilide:, N,N-dimethylacetamide: N,N-diethylacetamide; N,N-diisopropylacetamide; N,N-dibutylacetamide; N-methylacetanilide; N,N-dimethylpropionamide; N,N-diethylpropionamide; N,N-diisopropylpropionamide; N,N-dibutylpropionamide; N,N-dimethylisobutyramide; N,N-dimethyltrimethylacetamide; N,N-dimethylhexanoamide; N,N-dimethyloctadecanamide; N,N-dimethylacrylamide: N,N-dimethylmethacrylamide; N,N-dimethyl-2-fluoroacetamide; N,N-dimethyl-2-chloroacetamide; N,N-dimethyl-2-bromoacetamide; N,N-dimethyl-2,2-dichloroacetamide; N,N-dimethyl-2,2,2-trifluoroacetamide; N,N-diethyl-2,2,2-trifluoroacetamide; N,N-diisopropyl-2,2,2-trifluoroacetamide; N,N-dibutyl-2,2,2-trifluoroacetamide; N,N-dimethyl-2,2,2-trichloroacetamide; N,N-diethyl-2,2,2-trichloroacetamide; N,N-diisopropyl-2,2,2-trichloroacetamide; N,N-dibutyl-2,2,2-trichloroacetamide; N,N-dimethyl-2-chloropropionamide; 1-acetylazetidine; 1-acetylpyrrolidine; 1-acetylpiperidine; 1-acetylpiperazine; 1-acetylpiperazine; 1,4-diacetylpiperazine and the like. Preferred for use herein are N,N-formamide, N,N-dimethylacetamide and N,N-diisopropylformamide.

Exemplary of anhydrides used herein to reduce the melting peak temperature are compounds containing at least one C(=O)—O—C(=O) anhydride linkage. Exemplary are saturated or unsaturated aliphatic, alicyclic, or aromatic compounds containing an anhydride linkage. Included within the anhydrides are compounds containing heteroatoms, which are atoms other than carbon, selected from Groups 13, 14, 15, 16 and 17 of the Periodic Table of Elements. Exemplary of anhydrides are acetic anhydride; propionic anhydride; butyric anhydride; isobutyric anhydride; valeric anhydride; trimethylacetic anhydride; hexanoic anhydride; heptanoic anhydride; decanoic anhydride; lauric anhydride; myristic anhydride; palmitic anhydride; stearic anhydride; docosanoic anhydride; crotonic anhydride; methacrylic anhydride; oleic anhydride; linoleic anhydride; chloroacetic anhydride; iodoacetic anhydride; dichloroacetic anhydride; trifluoroacetic anhydride; chlorodifluoroacetic anhydride; trichloroacetic anhydride; pentafluoropropionic anhydride; heptafluorobutyric anhydride; succinic anhydride; methylsuccinic anhydride; 2,2-dimethylsuccinic anhydride; itaconic anhydride; maleic anhydride; glutaric anhydride; diglycolic anhydride; benzoic anhydride; phenylsuccinic anhydride; phenylmaleic anhydride; homophthalic anhydride; isatoic anhydride; phthalic anhydride; tetrafluorophthalic anhydride; tetrabromophthalic anhydride, mixed anhydrides and the like.

Exemplary of acid halides used herein to reduce the melting peak temperature are compounds containing at least one —C(=O)—X acid halide group where X is a halogen. Exemplary are saturated or unsaturated aliphatic, alicyclic, or aromatic compounds containing an acid halide group. Included within the acid halides are compounds containing heteroatoms, which are atoms other than carbon, selected from Groups 13, 14, 15, 16 and 17 of the Periodic Table of Elements. Exemplary of acid halides are acetyl chloride; acetyl bromide; chloroacetyl chloride; dichloroacetyl chloride; trichloroacetyl chloride; trifluoroacetyl chloride; tribromoacetyl chloride; propionyl chloride; propionyl bromide; butyryl chloride; isobutyryl chloride; trimethylacetyl chloride; 3-cyclopentylpropionyl chloride; 2-chloropropionyl chloride; 3-chloropropionyl chloride; tert-butylacetyl chloride; isovaleryl chloride; hexanoyl chloride; heptanoyl chloride; decanoyl chloride; lauroyl chloride; myristoyl chloride; palmitoyl chloride; stearoyl chloride; oleoyl chloride; cyclopentanecarbonyl chloride; oxalyl chloride; malonyl dichloride; succinyl chloride glutaryl dichloride; adipoyl chloride; pimeloyl chloride; suberoyl chloride; azelaoyl chloride; sebacoyl chloride; dodecanedioyl dichloride; methoxyacetyl chloride; acetoxyacetyl chloride and the like.

Exemplary of aldehydes used herein to reduce the melting peak temperature are compounds containing at least one C—C(=O)—H aldehyde group. Exemplary are saturated or unsaturated aliphatic, alicyclic, or aromatic compounds containing an aldehyde group. Included within the aldehydes are compounds containing heteroatoms, which are atoms other than carbon, selected from Groups 13, 14, 15, 16 and 17 of the Periodic Table of Elements. Exemplary of aldehydes are formaldehyde; acetaldehyde; propionaldehyde; isobutyraldehyde; trimethylacetaldehyde; butyraldehyde; 2-methylbutyraldehyde; valeraldehyde; isovaleraldehyde; hexanal; 2-ethylhexanal; heptaldehyde; decyl aldehyde; crotonaldehyde; acrolein; methacrolein; 2-ethylacrolein; chloroacetaldehyde; iodoacetaldehyde; dichloroacetaldehyde; trifluoroacetaldehyde; chlorodifluoroacetaldehyde; trichloroacetaldehyde; pentafluoropropionaldehyde; heptafluorobutyraldehyde; phenylacetaldehyde; benzaldehyde; o-tolualdehyde; m-tolualdehyde; p-tolualdehyde; trans-cinnamaldehyde; trans-2-nitrocinnamaldehyde; 2-bromobenzaldehyde; 2-chlorobenzaldehyde; 3-chlorobenzaldehyde; 4-chlorobenzaldehyde and the like.

Exemplary of ketones used herein to reduce the melting peak temperature are compounds containing at least one C—C(=O)—C ketone linkage. Exemplary are saturated or unsaturated aliphatic, alicyclic, or aromatic compounds containing a ketone linkage. Included within the ketones are compounds containing heteroatoms, which are atoms other than carbon, selected from Groups 13, 14, 15, 16 and 17 of the Periodic Table of Elements. Exemplary of ketones are acetone; 2-butanone; 3-methyl-2-butanone; pinacolone; 2-pentanone; 3-pentanone; 3-methyl-2-pentanone; 4-methyl-2-pentanone; 2-methyl-3-pentanone; 4,4-dimethyl-2-pentanone; 2,4-dimethyl-3-pentanone; 2,2,4,4-tetramethyl-3-pentanone; 2-hexanone; 3-hexanone; 5-methyl-2-hexanone; 2-methyl-3-hexanone; 2-heptanone; 3-heptanone; 4-heptanone; 2-methyl-3-heptanone; 5-methyl-3-heptanone; 2,6-dimethyl-4-heptanone; 2-octanone; 3-octanone; 4-octanone; acetophenone; benzophenone; mesityl oxide; hexafluoroacetone; perfluoro-2-butanone; 1,1,1-trichloroacetone and the like.

Exemplary of nitrites used herein to reduce the melting peak temperature are compounds containing at least one C—C≡N nitrile group. Exemplary are saturated or unsaturated aliphatic, alicyclic, or aromatic compounds containing a nitrile group. Included within the nitriles are compounds containing heteroatoms, which are atoms other than carbon, selected from Groups 13, 14, 15, 16 and 17 of the Periodic Table of Elements. Exemplary of nitrites are acetonitrile; propionitrile; isopropionitrile; butyronitrile; isobutyronitrile; valeronitrile; isovaleronitrile; trimethylacetonitrile; hexanenitrile; heptanenitrile; heptyl cyanide; octyl cyanide; undecanenitrile; malononitrile; succinonitrile; glutaronitrile; adiponitrile; gebaconitrile; allyl cyanide; acrylonitrile; crotononitrile; methacrylonitrile; fumaronitrile; tetracyanoethylene; cyclopentanecarbonitrile; cyclohexanecarbonitrile; dichloroacetonitrile; fluoroacetonitrile; trichloroacetonitrile; benzonitrile; benzyl cyanide; 2-methylbenzyl cyanide; 2-chlorobenzonitrile;

3-chlorobenzonitrile; 4-chlorobenzonitrile; o-tolunitrile; m-tolunitrile; p-tolunitrile and the like. Preferred for use herein are acetonitrile; isopropionitrile; trimethylacetonitrile and benzonitrile.

Exemplary of isonitriles or isocyanides used herein to reduce the melting peak temperature are compounds containing at least one C—N≡C isocyanide group. Exemplary are saturated or unsaturated aliphatic, alicyclic, or aromatic compounds containing a isocyanide group. Included within the isocyanides are compounds containing heteroatoms, which are atoms other than carbon, selected from Groups 13, 14, 15, 16 and 17 of the Periodic Table of Elements. Exemplary of isocyanides are methyl isocyanide; ethyl isocyanide; propyl isocyanide; isopropyl isocyanide; n-butyl isocyanide; t-butyl isocyanide; s-butyl isocyanide; pentyl cyanide; hexyl isocyanide; heptyl isocyanide; octyl isocyanide; nonyl isocyanide; decyl isocyanide; undecane isocyanide; benzyl isocyanide; 2-methylbenzyl isocyanide; 2-chlorobenzo isocyanide; 3-chlorobenzo isocyanide; 4-chlorobenzo isocyanide; o-toluyl isocyanide; m-toluyl isocyanide; p-toluyl isocyanide; phenyl isocyanide dichloride; 1,4-phenylene diisocyanide and the like.

Exemplary of thiocyanates used herein to reduce the melting peak temperature are compounds containing at least one C—SCN thiocyanate group. Exemplary are saturated or unsaturated aliphatic, alicyclic, or aromatic compounds containing a thiocyanate group. Included within the thiocyanates are compounds containing heteroatoms, which are atoms other than carbon, selected from Groups 13, 14, 15, 16 and 17 of the Periodic Table of Elements. Exemplary of thiocyanates are methyl thiocyanate: ethyl thiocyanate: propyl thiocyanate; isopropyl thiocyanate; n-butyl thiocyanate; t-butyl thiocyanate; s-butyl thiocyanate; pentyl thiocyanate; hexyl thiocyanate; heptyl thiocyanate; octyl thiocyanate; nonyl thiocyanate; decyl thiocyanate; undecane thiocyanate; benzyl thiocyanate; phenyl thiocyanate; 4'-bromophenyacyl thiocyanate; 2-methylbenzyl thiocyanate; 2-chlorobenzo thiocyanate; 3-chlorobenzo thiocyanate; 4-chlorobenzo thiocyanate; o-toluyl thiocyanate; m-toluyl thiocyanate; p-toluyl thiocyanate and the like.

Exemplary of isothiocyanates used herein to reduce the melting peak temperature are compounds containing at least one C—NCS isothiocyanate group. Exemplary are saturated or unsaturated aliphatic, alicyclic, or aromatic compounds containing a isothiocyanate group. Included within the isothiocyanates are compounds containing heteroatoms, which are atoms other than carbon, selected from Groups 13, 14, 15, 16 and 17 of the Periodic Table of Elements. Exemplary of isothiocyanates are methyl isothiocyanate; ethyl isothiocyanate; propyl isothiocyanate; isopropyl isothiocyanate; n-butyl isothiocyanate; t-butyl isothiocyanate; s-butyl isothiocyanate; pentyl isothiocyanate; hexyl isothiocyanate; heptyl isothiocyanate; octyl isothiocyanate; nonyl isothiocyanate; decyl isothiocyanate; undecane isothiocyanate; phenyl isothiocyanate; benzyl isothiocyanate; phenethyl isothiocyanate; o-tolyl isothiocyanate; 2-fluorophenyl isothiocyanate; 3-fluorophenyl isothiocyanate; 4-fluorophenyl isothiocyanate; 2-nitrophenyl isothiocyanate; 3-nitrophenyl isothiocyanate; 4-nitrophenyl isothiocyanate; 2-chlorophenyl isothiocyanate; 2-bromophenyl isothiocyanate; 3-chlorophenyl isothiocyanate; 3-bromophenyl isothiocyanate; 4-chlorophenyl isothiocyanate; 2,4-dichlorophenyl isothiocyanate; R-(+)-alpha-methylbenzyl isothiocyanate; S-(−)-alpha-methylbenzyl isothiocyanate; 3-isoprenyl-alpha,alpha-dimethylbenzyl isothiocyanate; trans-2-phenylcyclopropyl isothiocyanate; 1,3-bis(isocyanatomethyl)-benzene; 1,3-bis(1-isocyanato-1-methylethyl)benzene; 2-ethylphenyl isothiocyanate; benzoyl isothiocyanate; 1-naphthyl isothiocyanate; benzoyl isothiocyanate; 4-bromophenyl isothiocyanate; 2-methoxyphenyl isothiocyanate; m-tolyl isothiocyanate; alpha, alpha, alpha-trifluoro-m-tolyl isothiocyanate; 3-fluorophenyl isothiocyanate; 3-chlorophenyl isothiocyanate; 3-bromophenyl isothiocyanate; 1,4-phenylene diisothiocyanate; 1-isothiocyanato-4-(trans-4-propylcyclohexyl)benzene; 1-(trans-4-hexylcyclohexyl)-4-isothiocyanatobenzene; 1-isothiocyanato-4-(trans-4-octylcyclohexyl) benzene; 2-methylbenzyl isothiocyanate; 2-chlorobenzo isothiocyanate; 3-chlorobenzo isothiocyanate; 4-chlorobenzo isothiocyanate; m-toluyl isothiocyanate; p-toluyl isothiocyanate and the like.

Exemplary of sulfoxides used herein to reduce the melting peak temperature are compounds containing at least one C—S(=O)—C sulfoxo group. Exemplary are saturated or unsaturated aliphatic, alicyclic, or aromatic compounds containing a sulfoxo group. Included within the sulfoxides are compounds containing heteroatoms, which are atoms other than carbon, selected from Groups 13, 14, 15, 16 and 17 of the Periodic Table of Elements. Exemplary of sulfoxides are methyl sulfoxide; ethylsulfoxide; propylsulfoxide; butyl sulfoxide; pentyl sulfoxide; hexyl sulfoxide; heptyl sulfoxide; octyl sulfoxide; nonyl sulfoxide; decyl sulfoxide; phenyl sulfoxide; p-tolyl sulfoxide; m-tolyl sulfoxide; o-tolyl sulfoxide; methyl phenyl sulfoxide; (R)-(+)-methyl p-tolyl sulfoxide; (S)-(−)-methyl phenyl sulfoxide; phenyl vinyl sulfoxide; 4-chlorophenyl sulfoxide; methyl (phenylsulfinyl)acetate; benzyl sulfoxide; tetramethylene sulfoxide; methyl methylsulfinylmethyl sulfide; dl-methionine sulfoxide; dl-methionine sulfoximine and the like.

Exemplary of sulfones used herein to reduce the melting peak temperature are compounds containing at least one C—S(=O)$_2$—C sulfone group. Exemplary are saturated or unsaturated aliphatic, alicyclic, or aromatic compounds containing a sulfone group. Included within the sulfones are compounds containing heteroatoms, which are atoms other than carbon, selected from Groups 13, 14, 15, 16 and 17 of the Periodic Table of Elements. Exemplary of sulfones are methyl sulfone; ethyl sulfone; propyl sulfone; butyl sulfone; methyl vinyl sulfone; ethyl vinyl sulfone; divinyl sulfone; phenyl vinyl sulfone; allyl phenyl sulfone; cis-1,2-bis(phenylsulfonyl)ethylene; 2-(phenylsulfonyl)tetrahydropyran; chloromethyl phenyl sulfone; bromomethyl phenyl sulfone; phenyl tribromomethyl sulfone; 2-chloroethyl phenyl sulfone; methylthiomethyl phenyl sulfone; (phenylsulfonyl)acetonitrile; chloromethyl p-tolyl sulfone; N,N-bis(p-tolylsulfonylmethyl)-ethylamine; methylthiomethyl p-tolyl sulfone; 2-(phenylsulfonyl)acetophenone; methyl phenylsulfonylacetate; 4-fluorophenyl methyl sulfone; 4-chlorophenyl 2-chloro-1,1,2-trifluoroethyl sulfone; tosylmethyl isocyanide; phenyl sulfone; benzyl sulfone; phenyl transstyryl sulfone; 1-methyl-2-((phenylsulfonyl)methyl)-benzene; 1-bromomethyl-2-((phenylsulfonyl)-methyl)benzene; p-tolyl sulfone; bis(phenylsulfonyl)methane; 4-chlorophenyl phenyl sulfone; 4-fluorophenyl sulfone; 4-chlorophenyl sulfone; 4,4'-sulfonylbis(methyl benzoate); 9-oxo-9H-thioxanthene-3-carbonitrile 10,10-dioxide; tetramethylene sulfone; 3-methylsulfolane; 2,4-dimethylsulfolane; trans-3,4-dichlorotetrahydrothiophene 1,1-dioxide; trans-3,4-dibromotetrahydrothiophene 1,1-dioxide; 3,4-epoxytetrahydrothiophene-1,1-dioxide; butadiene sulfone; 3-ethyl-2,5-dihydrothiophene-1,1-dioxide and the like.

Exemplary of phosphorous compounds used herein to reduce the melting peak temperature are saturated or unsaturated aliphatic, alicyclic, or aromatic phosphorous compounds having 2 to 50 carbon atoms containing at least one phosphorous atom. Included within the phosphorous compounds are compounds containing heteroatoms, which are atoms other than carbon, selected from Groups 13, 14, 15, 16 and 17 of the Periodic Table of Elements. Exemplary of phosphorous compounds are trimethylphosphine; triethylphosphine; trimethyl phosphite; triethyl phosphite; hexamethylphosphorus triamide; hexamethylphosphoramide; tripiperidinophosphine oxide; triphenylphosphine; tri-p-tolylphosphine; tri-m-tolylphosphine; tri-o-tolylphosphine; methyldiphenylphosphine; ethyldiphenylphosphine; isopropyldiphenylphosphine; allyldiphenylphosphine; cyclohexyldiphenylphosphine; benzyldiphenylphosphine; di-tert-butyl dimethylphosphorarnidite; di-tert-butyl diethylphosphoramidite; di-tert-butyl diisopropylphosphoramidite; diallyl diisopropylphosphoramidite and the like.

Exemplary of organosilicon compounds used herein to reduce the melting peak temperature are saturated or unsaturated aliphatic, alicyclic, or aromatic organosilicon compounds having 2 to 50 carbon atoms containing at least one oxygen atom. Included within the organosilicon compounds are compounds containing heteroatoms, which are atoms other than carbon, selected from Groups 13, 14, 15, 16 and 17 of the Periodic Table of Elements. Exemplary of organosilicon compounds are tetramethyl orthosilicate; tetraethyl orthosilicate; tetrapropyl orthosilicate; tetrabutyl orthosilicate; trichloromethoxysilane; trichloroethoxysilane; trichloropropoxysilane; trichloroisopropoxysilane; trichlorobutoxysilane; trichloroisobutoxysilane; dichlorodimethoxysilane; dichlorodiethoxysilane; dichlorodipropoxysilane; dichlorodiisopropoxysilane; dichlorodibutoxysilane; dichlorodiisobutoxysilane; chlorotrimethoxysilane; chlorotriethoxysilane; chlorotripropoxysilane; chlorotriisopropoxysilane; chlorotributoxysilane; chlorotriisobutoxysilane; dimethylmethoxysilane; diethylmethoxysilane; dipropylmethoxysilane; diisopropylmethoxysilane; dibutylmethoxysilane; diisobutylmethoxysilane; dipentylmethoxysilane; dicyclopntylmethoxysilane; dihexylmethoxysilane; dicyclohexylmethoxysilane; diphenylmethoxysilane; dimethylethoxysilane; diethylethoxysilane; dipropylethoxysilane; dimsopropylethoxysilane; dibutylethoxysilane; dipsobutylethoxysilane; dipentylethoxysilane; dicyclopentylethoxysilane; dihexylethoyysilane dicyclohexylethoxygilane, diphenylethoxysilane, trimethylmethoxysilane; triethylmethoxysilane; tripropylmethoxysilane; triisopropylmethoxysilane; tributylmethoxysilane; triisobutylmethoxysilane; tripentylmethoxysilane; tricyclopentylmethoxysilane; trihexytmethoxysilane; tricyclohexylmethoxysilane; triphenylmethoxysilane; trimethylethoxysilane; triethylethoxysilane; tripropylethoxysilane; triisopropylethoxysilane; tributylethoxysilane; triisobutylethoxysilane; tripentylethoxysilane; tricyclopentylethoxysilane; trihexylethoxysilane; tricyclohexylethoxysilane; triphenylethoxysilane; dimethyldimethoxysilane; diethyldimethoxysilane; dipropyldimethoxysilane; diisopropyldimethoxysilane, dibutyldimethoxysilane; diisobutyldimethoxysilane; dipentyldimethoxysilane; dicyclopentyldimethoxysilane; dihexyldimethoxysilane; dicyclohexyldimethoxysilane; diphenyldimethoxysilane; dimethyldiethoxygilane; diethyldiethoxysilane; dipropyldiethoxysilane; diisopropyldiethoxysilane; dibutyldiethoxysilane; diisobutyldiethoxysilane; dipentyldiethoxysilane; dicyclopentyldiethoxysilane; dihexyldiethoxysilane; dicyclohexyldiethoxysilane; diphenyldiethoxysilane; cyclopentylmethyldimethoxysilane; cyclopentylethyldimethoxysilane; cyclopentylpropyldimethoxysilane; cyclopentylmethyldiethoxysilane; cyclopentylethyldiethoxysilane; cyclopentylpropyldiethoxysilane; cyclohexylmethyldimethoxysilane; cyclohexylethyldimethoxysilane; cyclohexylpropyldimethoxysilane; cyclohexylmethyldiethoxysilane; cyclohexylethyldiethoxysilane; cyclohexylpropyldiethoxysilane; methyltrimethoxysilane; ethyltrimethoxysilane; vinyltrimethoxysilane; propyltrimethoxysilane; isopropyltrimethoxysilane; butyltrimethoxysilane; isobutyltrimethoxysilane; tert-butyltrimethoxysilane; pnenyltrimethoxysilane; norbornanetrimethoxysilane; methyltrlethoxysilane ethyltriethoxysilane; vinyltriethoxysilane; propyltriethoxysilane; isopropyltriethoxysilane; butyltriethoxysilane; isobutyltriethoxysilane; tert-butyltriethoxysilane; phenyltriethoxysilane; norbomanetriethoxysilane; 2,3-dimethyl-2-(trimethoxysilyl)butane; 2,3-dimethyl-2-(triethoxysilyl)butane; 2,3 dimethyl-2-(tripropoxysilyl)butane; 2,3-dimethyl-2-(triisopropoxysilyl)butane; 2,3-dimethyl-2-(trimethoxysilyl)pentane; 2,3-dimethyl-2-(triethoxysilyl)pentane; 2,3-dimethyl-2-(tripropoxysilyl)pentane; 2,3-dimethyl-2-(triisopropoxysilyl)pentane; 2-methyl-3-ethyl-2-(trimethoxysilyl)pentane; 2-methyl-3-ethyl-2-(triethoxysilyl)pentane; 2-methyl-3-ethyl-2-(tripropoxysilyl)pentane; 2-methyl-3-ethyl-2-(triisopropoxysilyl)pentane; 2,3,4-trimethyl-2-(trimethoxysilyl)pentane; 2,3,4-trimethyl-2-(triethoxysilyl)pentane; 2,3,4-trimethyl-2-(tripropoxysilyl)pentane; 2,3,4-trimethyl-2-(triisopropoxysilyl)pentane; 2,3-dimethyl-2-(trimethoxysilyl)hexane; 2,3-dimethyl-2-(triethoxysilyl)hexane; 2,3-dimethyl-2-(tripropoxysilyl)hexane; 2,3-dimethyl-2-(triisopropoxysilyl)hexane; 2,4-dimethyl-3-ethyl-2-(trimethoxysilyl)pentane: 2,4-dimethyl-3-ethyl-2-(triethoxysilyl)pentane; 2,4-dimethyl-3-ethyl-2-(tripropoxysilyl)pentane; 2,4-dimethyl-3-ethyl-2-(triisopropoxysilyl)pentane; 2,4-dimethyl-3-isopropyl-2-(trimethoxysilyl)pentane; 2,4-dimethyl-3-isopropyl-2-(triethoxysilyl)pentane; 2,4-dimethyl-3-isopropyl-2-(tripropoxysilyl)pentane; 2,4-dimethyl-2-isopropyl-2-(triisopropoxysilyl)pentane; hexamethyldisiloxane; 1,1,1,3,3,3-hexamethyldisilazane and the like. Preferred for use herein are cyclohexylmethyldimethoxysilane, tetraethyl orthosilicate and dicyclopentyldimethoxysilane.

Mixtures or combinations of two or more of the above modifiers can also be used herein as the modifier to reduce the melting peak temperature.

Metallocene catalysts are well known in the industry and are comprised of at least one transition metal component and at least one co-catalyst component. The transition metal component of the metallocene catalyst comprises a compound having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one transition metal. Preferably the moiety is a substituted or unsubstituted cyclopentadienyl. The transition metal is selected from Groups 3, 4, 5, 6, 7, 8, 9 and 10 of the Periodic Table of the Elements. Exemplary of such transition metals are scandium, titanium, zirconium, hafnium, vanadium, chromium, manganese, iron, cobalt, nickel, and the like, and mixtures thereof. In a preferred embodiment the transition metal is selected from Groups 4, 5 or 6 such as, for example, titanium, zirconium, haftijum, vanadium and chromium, and in a still further preferred embodiment, the transition metal is titanium or zirconium or mixtures thereof.

The co-catalyst component of the metallocene catalyst can be any compound, or mixtures thereof, that can activate the transition metal component(s) of the metallocene catalyst in olefin polymerization. Typically the co-catalyst is an alkylaluminoxane such as, for example, methylaluminoxane (MAO) and aryl substituted boron containing compounds such as, for example, tris(perfluorophenyl)borane and the salts of tetrakis(perfluorophenyl)borate.

There are many references describing metallocene catalygtg in great detail. For example, metallocene catalyst are described in U.S. Pat. Nos. 4,564,647; 4,752,597; 5,106,804; 5,132,380; 5,227,440; 5,296,565; 5,324,800; 5,331,071; 5,332,706; 5,350,723; 5,399,635; 5,466,766; 5,468,702; 5,474,962; 5,578,537 and 5,863,853. The entire contents of these patents are incorporated herein by reference.

The metallocene catalysts herein also include catalyst systems such as $[C_5H_5B—OEt]_2ZrCl_2$, $[C_5H_4CH_2CH_2NMe_2]TiCl_3$, $[PC_4Me_3Si(Me)_2NCMe_3]ZrCl_2$, $[C_5Me_4Si(Me)_2NCMe_3]TiCl_2$, and $(C_5H_5)(C_5H_7)ZrCl_2$.

The metallocene catalysts herein can be introduced in the process of the present invention in any manner. For example, the catalyst components can be introduced directly into the polymerization medium in the form of a solution, a slurry or a dry free flowing powder. The transition metal component (s) and the co-catalyst component(s) of the metallocene catalyst can be premnixed to form an activated catalyst prior to addition to the polymerization medium, or the components can be added separately to the polymerization medium, or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst.

Any or all of the components of the metallocene catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silicalchroria/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $MgCl_2$, $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, functionalized polystyrene, polyamides and polyesters.

The metallocene catalyst herein may be prepared by any method known in the art. The catalyst can be in the form of a solution, a slurry or a dry free flowing powder. The amount of metallocene catalyst used is that which is sufficient to allow production of the desired amount of the ethylene/olefin interpolymer.

In carrying out the polymerization process of the present invention, the co-catalyst(s) is added to the polymerization medium in any amount sufficient to effect production of the desired ethylene/olefin interpolymer. It is preferred to utilize the co-catalyst(s) in a molar ratio of co-catalyst(s) to transition metal component(s) of the metallocene catalyst ranging from about 0.5:1 to about 10000:1. In a more preferred embodiment, the molar ratio of co-catalyst(s) to transition metal component(s) ranges from about 0.5 1 to about 1000:1.

Optionally, any organometallic compound(s) may be added to the polymerization medium in addition to the metallocene catalyst herein. The organometallic compounds may be added for many purposes such as catalyst activity modifiers, particle morphology control agents and/or electrostatic charge mediators. Preferred for use herein are organoaluminum compounds such as trialkylaluminums, dlalkylatuminum halides, alkylaluminum dihalideg and alkylaluminum sesquihalides. Exemplary of such compounds are trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum, dimethylaluminum chloride, diethylaluminum chloride, dibutylaluminum chloride, diisobutylaluminum chloride, diethylaluminum bromide and diethylaluminum iodide, methylaluminum dichloride, yt ethylaluminum dichloride, butylaluminum dichloride, isobutylaluminum dichloride, ethylaluminum dibromide and ethylaluminum diiodide, methylaluminum sesquichloride, ethylaluminum sesquichloride, n-butylalumillum ses(quichloride, isobutylaluminum s squichloride, ethylaluminum sesquifluoride, ethylaluminum sesquibromide, ethylaluminum sesquiiodide and mixtures thereof.

The at least one or more organometallic compound(s), if utilized, can be added to the polymerization medium in any manner. For example, the organometallic compound(s) can be introduced directly into the polymerization medium or premixed with the modifier prior to addition to the polymerization medium. The amount of organometallic compound(s) added to the polymerization medium is any amount that is suitable to achieve the desired purpose. In a preferred embodiment, the molar ratio of organometallic compound(s) to modifier(s) ranges from about 100:1 to about 1:1.

The polymerization process of the present invention may be carried out sing any suitable process, for example, solution, slurry and gas phase. A particularly desirable method for producing ethylene/olefin interpolymers according to the present invention iSa a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991, 798 and Belgian Patent No. 839,380. These patents disclose gas phase polymerization processes wherein the polymerization medium in either mechanically agitated or fluidized by the continuous flow of the gaseous monomer and diluent. The entire contents of these patents are incorporated herein by reference.

In general, the polymerization procegg of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gag leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 120° C. In general, the reactor temperature is operated at the highest temperature that is feasible taking into account the sintering temperature of the polymer product within the reactor.

The process of the present invention is suitable for the production of interpolymers of ethylene, including copolymers, terpolymers, and the like, of ethylene and at least one or more other olefins wherein the ethylene content is at least about 50% by weight of the total monomers involved. Preferably the olefins are alpha-olefins. The olefins, for example, may contain from 3 to 16 carbon atoms. Exemplary olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of ethylene/olefin interpolymers containing long chain branching may occur.

In carrying out the polymerization process of the present invention the modifier used to reduce the melting peak temperature of the ethylene/olefin interpolymer is added in any manner. For example, the modifier may be added to the preformed catalyst, to the prepolymer during the prepolymerization step, to the preformed prepolymer and/or to the polymerization medium. The modifier may optionally be premixed with the co-catalyst. The modifier is added in any amount sufficient to reduce the melting peak temperature of the ethylene/olefin interpolymer to a level lower than would result in the same polymerization process in the absence of the modifier. In a preferred embodiment the melting peak temperature is reduced by at least 0.5° C. More preferably the melting peak temperature is reduced by at least 1.0° C. Most preferred the melting peak temperature is reduced by at least 2.0° C.

When the modifier is a liquid or solid at I atmosphere of pressure and at 20° C., it is preferred to incorporate the modifier in a molar ratio of modifier to transition metal component(s) of the metallocene catalyst ranging from about 0.001:1 to about 100:1. In a more preferred embodiment, where the modifier is a liquid or solid, the molar ratio of the modifier to transition metal component(s) ranges from about 0.01:1 to about 50:1. When the modifier is a gas at 1 atmosphere of pressure and at 20° C., it is preferred to incorporate the gaseous modifier at a concentration in the polymerization medium ranging from about 1 ppm by volume to about 10,000 ppm by volume. In a more preferred embodiment, the concentration of the gaseous modifier in the polymerization medium ranges from about 1 ppm by volume to about 1000 ppm by volume.

In carrying out the polymerization process of the present invention, the halogenated hydrocarbon may be added to the polymerization medium in any amount sufficient to effect production of the desired polyolefin. It is preferred to incorporate the halogenated hydrocarbon in a molar ratio of halogenated hydrocarbon to metal component of the metallocene catalyst ranging from about 0.001:1 to about 100:1. In a more preferred embodiment, the molar ratio of halogenated hydrocarbon to metal component ranges from about 0.001:1 to about 10:1.

Any conventional additive may be added to the ethylene/olefin interpolymers obtained by the invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The ethylene/olefin interpolymers of the present invention may be fabricated into films by any technique known in the art. For example, films may be produced by the well known cast film, blown film and extrusion coating techniques.

Further ethylene/olefin interpolymers may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. All patents referred to herein are incorporated by reference in their entirety.

EXAMPLES

In the following examples the test procedures listed below are used in evaluating the analytical properties of the ethylene/olefin interpolymers herein.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) Melting Peak Temperature ($T_m$) was determined in accordance with ASTM D 3418-97 using a Differential Scanning Calorimeter (DSC). The $T_m$ values listed in the tables are not true equilibrium melting points but are DSC peak temperatures of the melt transition recorded on the second heat cycle. In each case, approximately 10 mg of polymer sample was placed in an aluminum sample pan and the sample lid was crimped in place. The sample was then heated to 160° C. at a rate of 50° C./minute and held at 160° C. for 10 minutes. The sample was then cooled to −30° C. at a rate of 10° C./minute while recording the freezing or crystallization curve. After holding for 2 minutes at −30° C., the second heat cycle was initiated and the sample was heated at a rate of 10° C./minute to a final temperature of 160° C. while recording the heating curve. The melting peak temperature, $T_m$, was obtained from the melt transition on the heating curve of the second heat cycle.

EXAMPLES

The polymerization process utilized in Examples 1–39 herein is carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.0 feet per second.

When a liquid modifier is utilized, the liquid modifier is introduced continuously into the line for recycling the gaseous reaction mixture as a solution, for example, in n-hexane, n-pentane, isopentane or 1-hexene, at a concentration of about 1 weight percent.

When gaseous modifier is utilized, for example, $O_2$, $N_2O$, CO or $CO_2$, the gaseous modifier is introduced continuously into the line for recycling the gaseous reaction mixture.

Example 1

The polymerization process is carried out as described above. The olefins used herein are ethylene and 1-hexene. Hydrogen is used to control molecular weight. The metallocene catalyst comprises bis(1-butyl-3-methylcyclopentadienyl)zirconium dichloride and methylaluminoxane supported on silica. The compound that is introduced to reduce melting peak temperature is tetrahydrofuran.

The melting peak temperature ($T_m$) of the ethylene/1-hexene interpolymer is expected to be reduced, at a given melt index and density, as a result of incorporating the tetrahydrofuran in the polymerization medium.

Examples 2–28

The process of Example 1 is followed with the exception that the compound that is utilized to reduce the melting peak temperature ($T_m$) is as follows:

Example 2 diethyl ether,
Example 3 dibutyl ether,
Example 4 diisopropyl ether,
Example 5 tert-butyl methyl ether,
Example 6 1,2-dimethoxyethane,
Example 7 furan,
Example 8 ethyl benzoate,
Example 9 p-ethoxy ethyl benzoate,
Example 10 2-butanone,
Example 11 2,4-dimethyl-3-pentanone,
Example 12 triisopropylamnine,
Example 13 1-isobutylpiperidine,
Example 14 N,N-dimethylformamide,
Example 15 N,N-dimethylacetamnide,
Example 16 benzonitrile,
Example 17 isopropionitrfle,
Example 18 trifluoroacetaldehyde,
Example 19 benzaldehyde,
Example 20 tetrahydrothiophene,
Example 21 2,5-dimethyltetrahydrothiophene,
Example 22 isopropyl thiobenzoate,
Example 23 isobutyl thiolacetate,
Example 24 cyclohexylmethyldimethoxysilane,
Example 25 tetraethyl orthosilicate,
Example 26 dicyclopentyldimethoxysilane,
Example 27 acetonitrile,
Example 29 pyridine.

In each of the above Examples 2–28 the DSC melting peak temperature ($T_m$) of the ethylenel/1-hexene interpolymer, having a given melt index and density, is expected to be reduced as a result of utilizing the particular modifier hereinabove in the polymerization medium in place of THF as the modifier.

Examples 29–33

The process of Example 1 is followed with the exception that in place of the 1-hexene there is utilized the following comonomers:

Example 29 propyleine,
Example 30 1-butene,
Example 31 1-pentene,
Example 32 4-methylpent-1-ene,
Example 33 1-octene.

In each of the above Examples 29–33 the melting peak temperature ($T_m$) of the ethylene/olefin interpolymer is expected to be reduced, at a given melt index and density, as a result of incorporating the tetrahydrofuran in the polymerization medium.

Examples 34–38

The process of Example 1 is followed with the exception that the supported metallocene catalyst is replaced with the following silica supported metallocene catalysts Example 34 bis(1-butyl-3-methylcyclopentadienyl) dimethylzirconium and tris(perfluorophenyl)borane, Example 35 bis(1-butyl-3-methylcyclopentadienyl) dimethylzirconium and triphenylmethylium tetrakis (perfluorophenyl)borate, Example 36 (tert-butylamido)dimethyl(tetramethyl-$\eta^5$-cyclopentadienyl)silanetitaniumdimethyl and triphenylmethylium tetrakis(perfluorophenyl)borate, Example 37 (tert-butylamido)dimethyl(tetramethyl-$\eta^5$-cyclopentadienyl)silanetitaniumdimethyl and tris (perfluorophenyl)borane, Example 38 (tert-butylarido)dimethyl(tetrampthyl-$\eta^5$-cyclopentadienyl)silanetitaniumdimethyl and methylaluminoxane.

In each of the above Examples 34–38 the melting peak temperature ($T_m$) of the ethylenelolefin interpolymer is expected to be reduced, at a given melt index and density, as a result of incorporating the tetrahydrofuran in the polymerization medium

Example 39

The procegg of Example 1 is followed with the exception that trimethylaluminum is added, in addition to the metallocene catalyst, to the polymerization process.

Films can be prepared from the ethylene/olefin interpolymers of the present invention.

Articles such as molded items can also be prepared from the ethylene/olefin interpolymers of the present invention.

It should be clearly understood that the forms of the invention herein described are illustrative only and are not intended to limit the scope of the invention. The present invention includes all modifications falling within the scope of the following claims.

We claim:

1. A process for polymerizing ethylene and at least one or more other olefin(s) to produce an ethylene/olefin interpolymer having, at a given melt index and density, a reduced melting peak temperature ($T_m$) comprising contacting in a polymerization medium ethylene and at least one or more other olefin(s), a least one metallocene catalyst comprising at least one transition metal component having at least one moiety selected from the group consisting of substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and at least one modifier comprising at least one atom selected from Group 15 to Group 16 of the Periodic Table of Elements in an amount sufficient to reduce the melting peak temperature ($T_m$) of the ethylene/olefin interpolymer to a melting peak temperature ($T_m$) lower than would result in the polymerization process in absence of the modifier.

2. The process according to claim 1 wherein the metal(s) of the at least one transition metal component is selected from Groups 3, 4, 5, 6, 7, 8, 9 and 10 of the Periodic Table of the Elements, as defined herein.

3. The process according to claim 2 wherein the metal is selected from the group consisting of titanium, zirconium, hafnium, vanadium, chromium and mixtures thereof.

4. The process according to claim 3 wherein the metal is selected from the group consisting of titanium, zirconium and mixtures thereof.

5. The process according to claim 1 wherein the metallocene catalyst is supported on a carrier.

6. The process according to claim 5 wherein the carrier is selected from the group consisting of silica, alumina, magnesium chloride and mixtures thereof.

7. The process according to claim 1 further comprising adding at least one or more organometallic compounds to the polymerization medium.

8. The process according to claim 7 wherein the organometallic compound is an organoaluminum compound.

9. The process according to claim 1 further comprising adding a halogenated hydrocarbon to the polymerization medium.

10. The process according to claim 9 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

11. The process according to claim 10 wherein the halogenated hydrocarbon is chloroform.

12. The process according to claim 1 wherein the at least one modifier is selected from the group consisting of carboxylic acid esters, anhydrides, acid halides, ethers, thioethers, aldehydes, ketones, imines, amines, amides, nitrites, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, compounds of nitrogen, phosphorus, arsenic or antimony connected to an organic group through a carbon or oxygen atom, $O_2$, CO, $CO_2$, COS, NO, $N_2O$ and $NO_2$.

13. The process according to claim 12 wherein the at least one modifier is selected from the group consisting of carboxylic acid esters, ethers, amines, amides, nitrites, organosilicon compounds containing at least one oxygen atom, $O_2$, CO, $CO_2$ and $N_2O$.

14. The process according to claim 13 wherein the at least one modifier is an ether selected from the group consisting of tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, and tetrahydropyran.

15. The process according to claim 13 wherein the at least one modifier is an amine selected from the group consisting of pyridine, 4-methyl pyridine, N-methylmorpholine and N-methylimidazole.

16. The process according to claim 13 wherein the at least one modifier is an organosilicon compound containing at least one oxygen atom selected from the group consisting of cyclohexylmethyldimethoxysilane, tetraethyl orthosilicate and dicyclopentyldimethoxysilane.

17. The process according to claim 13 wherein the at least one modifier is a nitrile selected from the group consisting of acetonitrile, trimethylacetonitrile, benzonitrile and isopropionitrile.

18. The process according to claim 13 wherein the at least one modifier is an amide selected from the group consisting of N,N-dimethylformamide, N,N-dimethylacetamide and N,N-diisopropylformamide.

19. The process according to claim 13 wherein the at least one modifier is selected from the group consisting of $O_2$, CO, $CO_2$ and $N_2O$.

20. The process according to claim 19 wherein the at least one modifier is $N_2O$.

21. The process according to claim 1 wherein the modifier is liquid or solid and is added in a molar ratio of modifier to transition metal component(s) of the metallocene catalyst ranging from about 0.01:1 to about 100:1.

22. The process according to claim 21 wherein the molar ratio of modifier to transition metal component(s) of the metallocene catalyst ranges from about 0.1:1 to about 50:1.

23. The process according to claim 1 wherein the modifier is gaseous and is added in an amount ranging from about 1 ppm by volume to about 10,000 ppm by volume.

24. The process according to claim 23 wherein the modifier is added in an amount ranging from about 1 ppm by volume to about 1000 ppm by volume.

25. The process according to claim 1 wherein the polymerization medium is gas phase.

26. The process according to claim 1 wherein the polymerization medium is slurry phase.

27. The process according to claim 1 wherein the at least one or more other olefin(s) is selected from the group consisting of olefins having 3 to 16 carbon atoms.

28. The process according to claim 27 wherein the at least one or more other olefin(s) is selected from the group consisting of 1-octene, 1-hexene, 4-methylpent-1-ene, 1-pentene, 1-butene and propylene.

29. The process according to claim 1 wherein the ethylenelolefin interpolymer comprises ethylene in an amount of at least about 50% by weight of the interpolymer.

30. A process for reducing the melting peak temperature ($T_m$) of an ethylene/olefin interpolymer having a given density and melt index (MI) comprising introducing at least one modifier comprising at least one atom selected from Group 15 and Group 16 of the Periodic Table of Elements, into a polymerization process comprising ethylene and at least one or more other olefin(s) and at least one metallocene catalyst comprising at least one transition metal component having at least one moiety selected from the group consisting of substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, in an amount sufficient to reduce the melting peak temperature ($T_m$) of the ethylene/olefin interpolymer.

31. The process according to claim 30 wherein the metal(s) of the at least one transition metal component is selected from Groups 3, 4, 5, 6, 7, 8, 9 and 10 of the Periodic Table of the Elements.

32. The process according to claim 31 wherein the metal is selected from the group consisting of titanium, zirconium, hafnium, vanadium, chromium and mixtures thereof.

33. The process according to claim 32 wherein the metal is selected from the group consisting of titanium, zirconium and mixtures thereof.

34. The process according to claim 30 wherein the metallocene catalyst is supported on a carrier.

35. The process according to claim 34 wherein the carrier is selected from the group consisting of silica, alumina, magnesium chloride and mixtures thereof.

36. The process according to claim 30 further comprising adding at least one or more organometallic compounds to the polymerization process.

37. The process according to claim 36 wherein the organometallic compound is an organoaluminum compound.

38. The process according to claim 30 further comprising adding a halogenated hydrocarbon to the polymerization medium.

39. The process according to claim 38 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

40. The process according to claim 39 wherein the halogenated hydrocarbon is chloroform.

41. The process according to claim 30 wherein the at least one modifier is selected from the group consisting of carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, compounds of nitrogen, phosphorus, arsenic or antimony connected to an organic group through a carbon or oxygen atom, $O_2$, CO, $CO_2$, COS, NO, $N_2O$ and $NO_2$.

42. The process according to claim 41 wherein the at least one modifier is selected from the group consisting of carboxylic acid esters, ethers, amines, amides, nitriles, organosilicon compounds containing at least one oxygen atom, $O_2$, CO, $CO_2$ and $N_2O$.

43. The process according to claim 42 wherein the at least one modifier is an ether selected from the group consisting of tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, and tetrahydropyran.

44. The process according to claim 42 wherein the at least one modifier is an amine selected from the group consisting of pyridine, 4-methyl pyridine, N-methylmorpholine and N-methylimidazole.

45. The process according to claim 42 wherein the at least one modifier is an organosilicon compound containing at least one oxygen atom selected from the group consisting of cyclohexylmethyldimethoxysilane, tetraethyl orthosilicate and dicyclopentyldimethoxysilane.

46. The process according to claim 42 wherein the at least one modifier is a nitrile selected from the group consisting of acetonitrile, trimethylacetonitrile, benzonitrile and isopropionitrile.

47. The process according to claim 42 wherein the at least one modifier is an amide selected from the group consisting of N,N-dimethylformamide, N,N-dimethylacetamide and N,N-diisopropylformamide.

48. The process according to claim 42 wherein the at least one modifier is selected from the group consisting of $O_2$, CO, $CO_2$ and $N_2O$.

49. The process according to claim 48 wherein the at least one modifier is $N_2O$.

50. The process according to claim 30 wherein the at least one modifier is liquid or solid and is added in a molar ratio of modifier to transition metal component(s) of the metallocene catalyst ranging from about 0.01:1 to about 100:1.

51. The process according to claim 50 wherein the molar ratio of modifier to transition metal component(s) of the metallocene catalyst ranges from about 0.1:1 to about 50:1.

52. The process according to claim 30 wherein the at least one modifier is gaseous and is added in an amount ranging from about 1 ppm by volume to about 10,000 ppm by volume.

53. The process according to claim 52 wherein the modifier is added in an amount ranging from about 1 ppm by volume to about 1000 ppm by volume.

54. The process according to claim 30 wherein the polymerization medium is gas phase.

55. The process according to claim 30 wherein the polymerization medium is slurry phase.

56. The process according to claim 30 wherein the at least one or more other olefin(s) is selected from the group consisting of olefins having 3 to 16 carbon atoms.

57. The process according to claim 56 wherein the at least one or more other olefin(s) is selected from the group consisting of 1-octene, 1-hexene, 4-methylpent-1-ene, 1-pentene, 1-butene and propylene.

58. The process according to claim 30 wherein the ethylene/olefin interpolymer comprises ethylene in an amount of at least about 50% by weight of the interpolymer.

* * * * *